United States Patent

[11] 3,576,980

[72] Inventor Harold W. Doyle
Newport Beach, Calif.

[21] Appl. No. 716,918
[22] Filed Mar. 28, 1968
[45] Patented May 4, 1971
[73] Assignee California Computer Products, Inc.
Anaheim, Calif.

[54] AUTOMATIC CORNER RECOGNITION SYSTEM
6 Claims, 11 Drawing Figs.

[52] U.S. Cl. .......... 235/152, 340/146.3
[51] Int. Cl. .......... G06f 7/38
[50] Field of Search .......... 340/146.3; 235/152, 156, 186

[56] References Cited

UNITED STATES PATENTS

| | | | |
|---|---|---|---|
| 2,995,302 | 8/1961 | Ingwerson et al. | 235/152 |
| 2,934,824 | 5/1960 | Braybrook et al. | 235/152X |
| 3,254,203 | 5/1966 | Kveim | 235/152 |
| 3,372,268 | 3/1968 | Hoernes | 235/152X |

OTHER REFERENCES

H. R. Grace, CRT DEVICE USED FOR GRAPHICAL DIGITAL INPUT, IBM Technical Disclosure Bulletin Vol. 8 No. 4, Sept. 1965, pp.557— 558

T. J. Harris, OPTICAL GRAPHIC DISPLAY SYSTEM, IBM Technical Disclosure Bulletin, Vol. 10 No. 1 Jun. 1967, pp. 61— 629

*Primary Examiner*—Malcolm A. Morrison
*Assistant Examiner*—David H. Malzahn
*Attorney*—John A. Duffy

ABSTRACT: The angular change between successive line segments connecting consecutive data points defining a sample shape may be used to determine corners for controlling automatic pattern grading. When the segments are represented in vector notation the angular evaluation may be conveniently determined from the dot and cross product of the angle-forming vectors. Where long vectors are separated by short vectors, a corner reconstruction technique can be employed to locate a vertex approximately representative of the original sample shape.

INVENTOR.
HAROLD W. DOYLE
BY John A. Duffy
ATTORNEY.

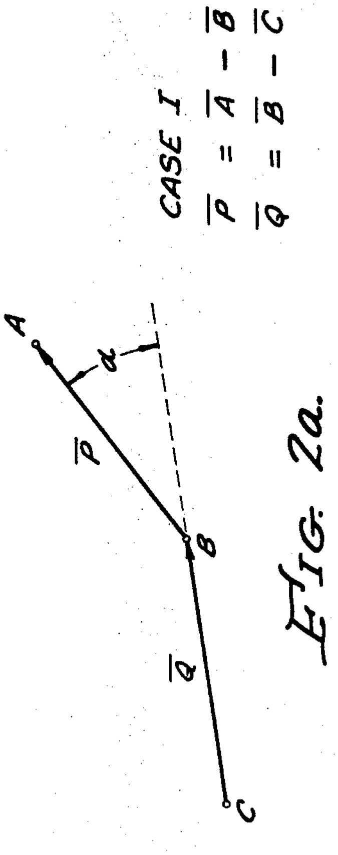
FIG. 2a.
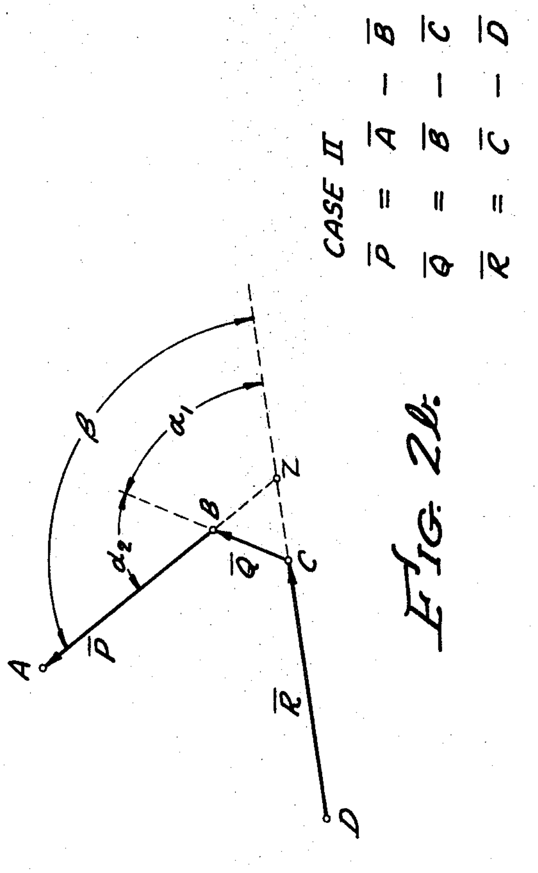
FIG. 2b.
| DATA POINTS | X | Y |
|---|---|---|
| a | 18.8 | 1.5 |
| b | 20.0 | 7.0 |
| c | 21.5 | 11.4 |
| d | 20.1 | 13.3 |
| e | 18.7 | 16.7 |
| f | 18.3 | 22.4 |
| g | 18.8 | 28.6 |
| h | 18.4 | 33.5 |
| i | 15.0 | 32.8 |
| j | 10.5 | 33.0 |
| k | 5.4 | 33.8 |
| l | 5.2 | 29.4 |
| m | 4.5 | 23.5 |
| n | 3.4 | 19.3 |
| p | 2.4 | 16.3 |
| q | 3.8 | 9.7 |
| r | 4.4 | 3.0 |
| s | 8.2 | 3.4 |
| t | 14.0 | 2.6 |
FIG. 1b.
INVENTOR.
HAROLD W. DOYLE
BY John A Duffy
ATTORNEY.

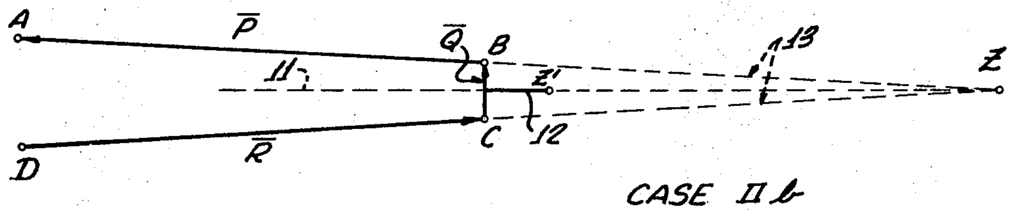

CASE II b $\overline{P} = \overline{A} - \overline{B}$ $\overline{Q} = \overline{B} - \overline{C}$ $\overline{R} = \overline{C} - \overline{D}$

FIG. 2c.

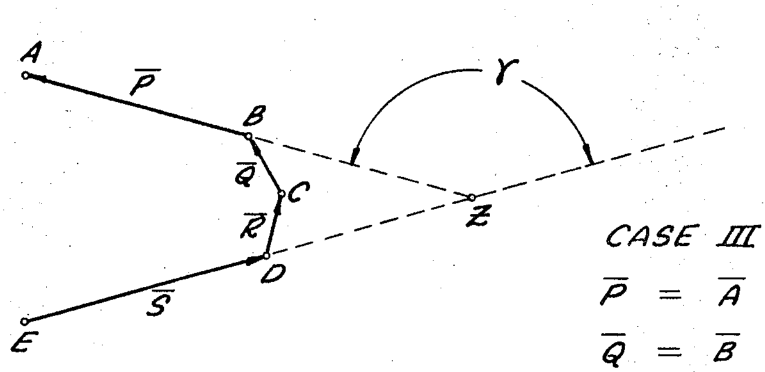

CASE III $\overline{P} = \overline{A} - \overline{B}$ $\overline{Q} = \overline{B} - \overline{C}$ $\overline{R} = \overline{C} - \overline{D}$ $\overline{S} = \overline{D} - \overline{E}$

FIG. 2d.

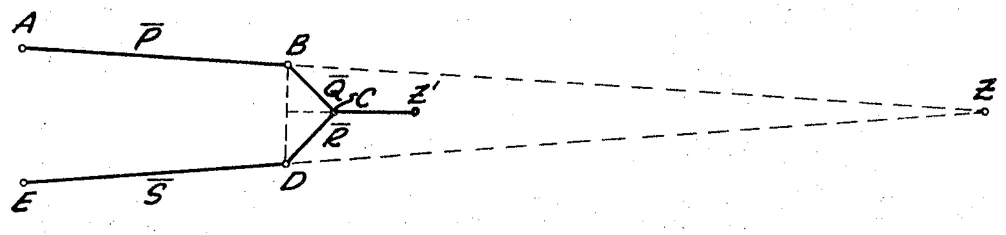

CASE III b $\overline{P} = \overline{A} - \overline{B}$ $\overline{Q} = \overline{B} - \overline{C}$ $\overline{R} = \overline{C} - \overline{D}$ $\overline{S} = \overline{D} - \overline{E}$

FIG. 2e.

INVENTOR.
HAROLD W. DOYLE
BY John A. Duffy
ATTORNEY.

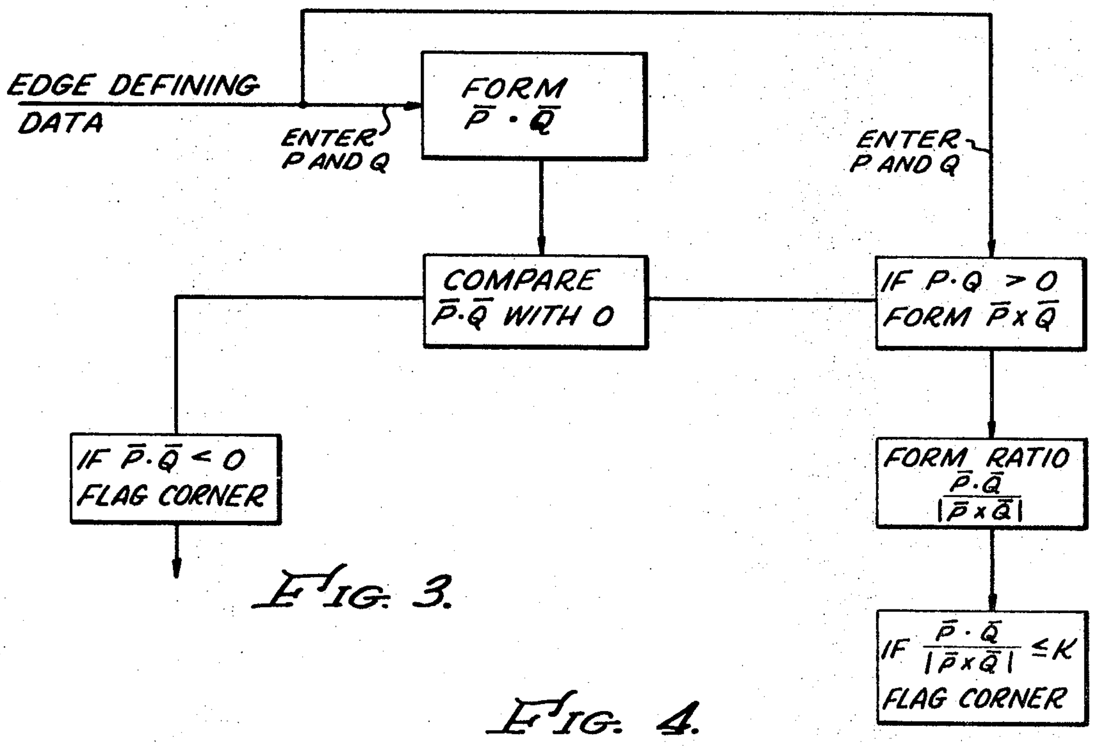

FIG. 3.

FIG. 4.

20

| ROW | $\bar{S}$ | $\bar{R}$ | $\bar{Q}$ | $\bar{P}$ | MOST RECENT VECTOR |
|---|---|---|---|---|---|
| 4 (1) | X | X | 1 | 1 | (POSSIBLE) NATURAL CORNER (CASE I) |
| 2 (2) | X | 1 | 0 | 1 | (POSSIBLE) 1ST ORDER RECONSTRUCTED CORNER (CASE II) |
| 1 (3) | 1 | 0 | 0 | 1 | (POSSIBLE) 2ND ORDER RECONSTRUCTED CORNER (CASE III) |
| 8 (4) | X | X | X | 0 | NON SAMPLING SITUATION |
| 1 (5) | 0 | 0 | 0 | 1 | NON SAMPLING SITUATION |

16 TOTAL NUMBER OF POSSIBLE COMBINATIONS

LEGEND

BINARY 1 = LONG VECTOR

BINARY 0 = SHORT VECTOR

X = EITHER SHORT OR LONG VECTOR

INVENTOR.
HAROLD W. DOYLE

BY John A. Duffy

ATTORNEY.

INVENTOR.
HAROLD W. DOYLE

BY John A. Duffy

ATTORNEY.

AUTOMATIC CORNER RECOGNITION SYSTEM

BACKGROUND OF THE INVENTION

In automatic processing of graphical data it is frequently necessary to distinguish corners from among the totality of shape-defining data points. Thus, in the apparel industry, the automatic grading of clothing patterns to increase or decrease boundary segments, or edges, proportionately from a reference size pattern requires a predetermination of corners in order that each edge may be altered in a particular way to create new sizes so as to preserve the aesthetic and stylistic qualities present in the reference size. The raw data describing the reference pattern is obtained using manual or automatic digitizers, and just be of sufficient lineal density to represent the straight or curved boundary segments of the empirical shape to within a specified accuracy. For example, data points may be spaced so that no point on the actual reference pattern outline exceeds a distance of 0.01 inch from the straight line segments connecting the digitized data points, in which case the collected data defines the reference pattern to within a 0.01 inch accuracy tolerance.

In manually assembled data, the recognition of corners is usually made by some method of manually flagging the appropriate data points as they are visually encountered. Thus, the operator may depress a distinct switch during the digitizing operation which causes a special code to be affixed to the data point as it is entered into a storage medium, or alternatively, the operator may indicate a corner by digitizing the same point twice in succession. In any method of manual flagging however, additional manual effort and operator recognition are required. Furthermore, the chance of error and the possibility of nonuniform results are greatly increased using manual corner recognition techniques.

Accordingly, it is an object of this invention to provide a system for automatically recognizing corners from among the totality of data points representing the perimeter of an empirical shape. Other objects and advantages of the invention will be obvious from a detailed description of a preferred embodiment given below.

SUMMARY OF THE INVENTION

The corner recognition system described herein comprises a processing unit for distinguishing the corners of an empirical shape in accordance with variable standards under control of the operator and a digitizing apparatus for locating a sufficient number of data points to adequately represent the boundaries of the figure under investigation. The digitized data is fed to the processor, where the equations of the vector segments connecting successive data points are obtained. The processor then functions to classify each vector segment as long or short and to test the angle formed by successive long vectors as a corner. If the angular change between successive long vectors is sufficiently large to satisfy predetermined criteria, the processor computes the corner coordinates and outputs the information for further processing.

DESCRIPTION OF THE DRAWINGS

FIG. 1*b* shows the corresponding digital representation of the same shape.

FIG. 2*a*—2*a* shows the fundamental patterns of data occurrence as follows:

FIG. 2*a* illustrates adjacent long vectors;

FIG. 2*b* illustrates long vectors separated by a single short vector;

FIG. 2*c* illustrates nearly parallel long vectors separated by a single short vector;

FIG. 2*d* illustrates long vectors separated by two short vectors;

FIG. 2*e* illustrates nearly parallel long vectors separated by two short vectors.

FIG. 3 shows a block diagram of the sequence of operation for corner recognition.

FIG. 4 is a table of the possible combinations of long and short vectors.

DESCRIPTION OF A PREFERRED EMBODIMENT

Figure 1A:
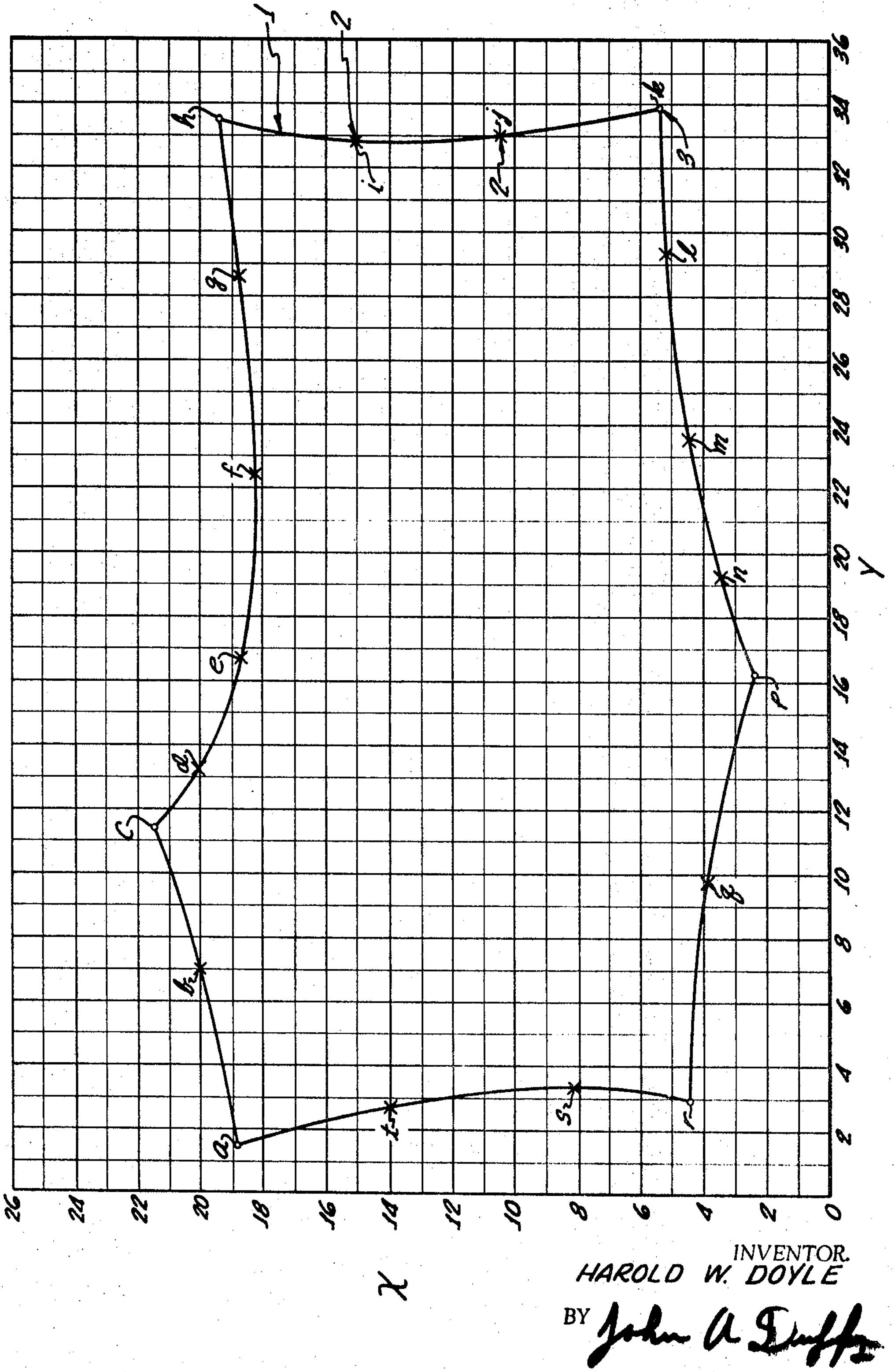
FIG. 1*a* shows a typical graphical shape.

Referring to the drawings and in particular to FIG. 1*a*, there is displayed an empirical shape defined by the perimeter 1 which may be represented in X-Y coordinates as shown by the tabulation in FIG. 1*b* to any desired degree of accuracy. For purposes of illustration, ordinary data points 2 are indicated by an X whereas the corner points 3 are indicated by an O.

It may be mentioned at the outset that the methods of data collection may vary, both in terms of the methods used for digitizing and in the uniformity of sample points spacing. Considering, in addition, the innumerable configurations that may be encountered together with the possibility that the definition of a corner will vary depending upon the application and type of pattern involved, it will be seen that the technology of the invention employs several separate and distinct methods to effectuate reliable corner recognition under all circumstances. In order to fully understand the operative embodiment of the corner recognition system each of the basic methods will now be separately considered.

FIG. 2 illustrates five groups of points, any point of which may or may not be recognized as a corner, depending upon the corner-defining criteria. A discussion of the means used for distinguishing the separate cases I, II, II*b*, III and III*b* will be deferred until the methods of corner recognition are considered.

The simplest case of a corner formed by three consecutive data points C, B, A describing the edge of an empirical shape is shown in FIG. 2*a*. The straight line segment connecting the data point B to data point A may be expressed in vector notation as:

$$\overline{P}=\overline{A}-\overline{B} \quad (1)$$

where the vectors $\overline{A}$ and $\overline{B}$ represent lines drawn from an arbitrary origin to the points A and B respectively. Similarly, the vector Q may be expressed as:

$$\overline{Q}=\overline{B}-\overline{C} \quad (2)$$

where $\overline{B}$ has been previously defined and $\overline{C}$ is the line from the arbitrary origin to the point C. The angle $\alpha$ formed by the vectors $\overline{Q}$ and $\overline{P}$ is the angular change in direction of the edge at the point B in progressing from C to B to A. Whether the point B is to be flagged as a corner thus depends upon the angular deviation $\alpha$. Assuming for example that it is desired to locate and identify corners for all angular changes greater than or equal to 45°, the following procedure may be used. First the dot product Q·P is formed according to the familiar equation:

$$\overline{Q}\cdot\overline{P}=QP\ \mathrm{COS}\ \alpha \quad (3)$$

and then tested as to sign. If the dot product is zero or negative, the angle $\alpha$ must be equal to or greater than 90°, in which case the process is terminated and the point B flagged as a corner. In the more interesting case where the dot product is positive, i.e., $$\overline{Q}\cdot\overline{P}>0 \quad (4)$$

it is necessary to perform additional computations. Thus, one could calculate $$\frac{\overline{Q}\cdot\overline{P}}{QP}=\cos\alpha \quad (5)$$

and thus calculate $\alpha$ from cosine $\alpha$. However, where automatic data processing machinery is utilized to perform the operations, it is simpler to form the cross product $$\overline{Q}\times\overline{P}=QP\ \mathrm{SIN}\ \alpha \quad (6)$$

and then test the ratio of the magnitudes of dot and cross products to determine whether $\alpha$ is greater than 45°. This also avoids the time required for normalizing operations since the magnitudes of $\overline{P}$ and $\overline{Q}$ cancel. Thus, $$\frac{\overline{Q}\cdot\overline{P}}{|\overline{Q}\times\overline{P}|}=\frac{\cos\alpha}{|\sin\alpha|} \quad (7)$$

where $|\overline{Q}\times\overline{P}|$ is the unsigned magnitude of the vector $\overline{Q}\times\overline{P}$. If the absolute magnitude of the ratio COS $\alpha$ | SIN $\alpha$ | is greater than unity, then $\alpha$ is less than 45° and no corner should be recognized according to the previously established criteria. Conversely, if COS $\alpha$ | SIN $\alpha$ | is less than unity, the angle $\alpha$ is greater than 45° and the point should be indicated as a corner. A block diagram of the decision making sequence is shown in FIG. 3.

In the above example, an arbitrary value of 45° was chosen as the angular threshold, $\alpha_o$, for corner recognition, and the testing criterion for qualifying a corner against an angular threshold $\alpha_o$=45° is $$\frac{\overline{Q}\cdot\overline{P}}{|\overline{Q}\times\overline{P}|}\leq 1 \qquad (8)$$

Depending upon the density of the data points and the error involved in digitizing, it may be advantageous in some applications to use some other value for the critical angle $\alpha_o$. This may be conveniently accomplished by requiring the ratio of dot to cross products to satisfy the relation:

$$\frac{\overline{Q}\cdot\overline{P}}{|\overline{Q}\times\overline{P}|}\leq \kappa \qquad (9)$$

where $\kappa$ = cotangent $\alpha_o$. Thus, for $\kappa$=2, $\alpha_o$=26.6°, and all corners forming an angle greater than 26.6° will be flagged. $\kappa$-values less than 1 may be used to set the critical angle, $\alpha_o$, at greater than 45°.

A more difficult problem in corner recognition is illustrated by the data point sequence D, C, B, A shown in FIG. 2*b*. There, the two long vector segments $\overline{R}$ and $\overline{P}$ are separated by a short vector $\overline{Q}$. This situation frequently arises when digitizing shapes where corners may have been blunted. It is apparent that applying the technique considered hereinabove (corner recognition based upon three consecutive data points) to the four-point sequence in FIG. 2*b* could conceivably yield one corner, two corners or no corners, depending upon the angles $\alpha_1$ and $\alpha_2$. In many applications however, it is desirable that the situation depicted in FIG. 2*b* be flagged as a single corner or not at all. The explanation of the method used for accomplishing this will now be undertaken.

It is seen from an examination of FIG. 2*b* that the four data points D, C, B, A may be treated analogously to the situation illustrated in Case I if each of the long vectors $\overline{P}$ and $\overline{R}$ are extended until they intersect at the point Z. The data points D, Z, A thus define a new angle $\beta$ which is tested as a corner in the exact same manner as that described above for Case I, i.e., the dot product $\overline{R}\cdot\overline{P}$ is first formed and Z is flagged as a corner if the dot product is less than zero. If not, the cross product $\overline{R}\times\overline{P}$ is formed and the ratio of dot to cross product magnitudes is tested against the threshold value, λ, corresponding to the critical angle, $\beta_0$, viz, $$\frac{\overline{R}\cdot\overline{P}}{|\overline{R}\times\overline{P}|}\leq \lambda = \text{cotangent } \beta_0 \qquad (10)$$

to determine whether an obtuse interior angle of the digitized figure nevertheless qualifies as a corner. Expressing the coordinates of Z in terms of vector components, the equations for calculating the intersection point are as follows:

$$\Delta=(x_a-x_b)(y_c-_d)-(y_a-y_b)(x_c-_d) \qquad (11)$$

$$t=-[(x_b-x_c)(y_c-y_d)-(y_d-y_c)(x_c-x_d)]/\Delta,\ \Delta\neq 0 \quad (12)$$

$$x_z=_b+(x_a-x_b)t \qquad (13)$$

$$y_z=_b+(y_a-y_b)t \qquad (14)$$

Thus the coordinates of Z are computed, Z is flagged as a corner.

In certain situations, the long vectors $\overline{P}$ and $\overline{R}$ may be nearly parallel as shown in FIG. 2*c*. In such a case it is not desirable to flag their point of intersection as a corner, but rather to generate a new point Z′ which is more closely representative of the location of the actual pattern edge than the point Z. This anomaly may arise in cases where the empirical shape includes an extremely acute interior angle, or where there is a narrow indentation. Thus, in FIG. 2*c*, the digitizing of the pattern may result in the data points D, C, B, A. It will be seen that the point Z′ more closely approximates the actual pattern than the intersection Z of the long vector extensions 13. A useful technique for locating Z′ is to limit the corner construction to the magnitude of the short segment $\overline{Q}$ projected along the bisector 11 of the angle BZC as shown by the line 12.

FIG. 2*d* illustrates the situation occurring with 5 data points E, D, C, B, A. The recognition of a corner is methodized in exactly the same manner as previously described for Case II, except that the long vectors $\overline{P}$ and $\overline{S}$ rather than $\overline{P}$ and the short vector $\overline{R}$ are operated on to test the angle $\gamma$ as a corner.

$$\frac{\overline{S}\cdot\overline{P}}{|\overline{S}\times\overline{P}|}\leq \mu = \text{cotangent } \gamma_0 \qquad (15)$$

There also may be a Case III*b* as shown in FIG. 2*e* where the long vectors $\overline{S}$ and $\overline{P}$ are nearly parallel. This situation is treated analogously to that described for the Case II*b*, and the corner projection is limited to the magnitude of the distance $\overline{BD}$ extending along the bisector of the angle BZD. It will be understood that the critical angles $\alpha_0$, $\beta_0$, and $\gamma_0$ in each of the three cases described may be made equal or different from one another depending upon external criteria.

Although the methodology of corner recognition described herein may be extended to more than five consecutive data points, the great majority of applications do not require further refinement. Accordingly, the discussion of the method used for case recognition will be restricted to five data points, it being understood that the inventive means employed may be extended to include more data points if desired.

If each of the vector segments connecting any five consecutive edge defining data points is classified in accordance with a preestablished length criterion as either long (a binary 1) or short (a binary 0) there results 16 possible combinations of length sequences. Assuming the vectors $\overline{S}$, $\overline{R}$, $\overline{Q}$ and $\overline{P}$ are generated in the order indicated by the arrow 20 in FIG. 4, the Case I, II and III situations may be recognized immediately. The first row, for example, represents two successive segments $\overline{S}$ and $\overline{R}$ which may be either long or short followed by two successive long segments $\overline{Q}$ and $\overline{P}$ whose intersection must be tested as a corner using the methodology of Case I.

The reason that the lengths of the $\overline{R}$ and $\overline{S}$ vectors are immaterial in Row 1 is because only the corner formed by the two most recent vectors is being considered as a corner. The possible corner formed by $\overline{R}$ and $\overline{Q}$ was tested one time unit prior to the possible corner now being considered between $\overline{Q}$ and $\overline{P}$ whereas a possible corner between $\overline{S}$ and $\overline{R}$ was tested two time units in the past. The length of $\overline{R}$ as a short or long vector only becomes important where $\overline{Q}$ is short, as in the Case II situation shown in Row 2. Similarly, the length of $\overline{S}$ as short or long is only important where both $\overline{Q}$ and $\overline{R}$ are short as exemplified by the Case III situation illustrated in Row 3. Row 4 is obviously a nonsample situation since the most recent vector segment $\overline{P}$ is short—hence it is necessary to wait one time unit to determine whether the next vector will produce one of the ocmbinations shown in Row 2 or Row 3. In Row 5 it is also necessary to wait one time unit in order to see whether the next vector will produce the combination shown in Row 1.

For the purpose of recognizing the various cases, the rules for identification of a segment as short or long will depend upon both the particular application and the means used for digitizing. In some cases, the determination may be a relative one, whereas in others an absolute length criterion may be established. It should also be recognized that the principle of the invention is not limited to categorizing segments merely as short or long and that further refinement is possible with more degrees of classification.

Figure 5A:
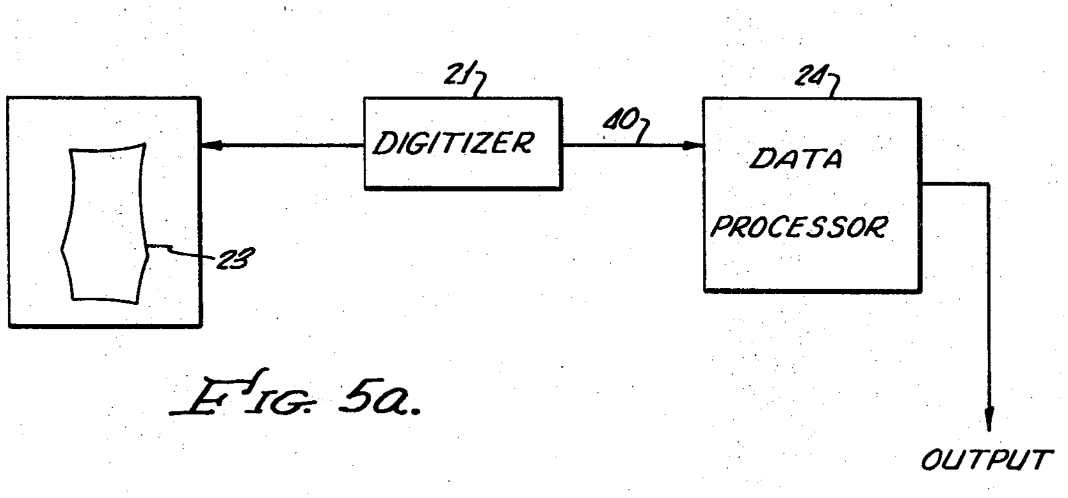
FIGS. 5*a*—5*b* are functional block diagrams of the corner recognition apparatus.
Figure 5B:
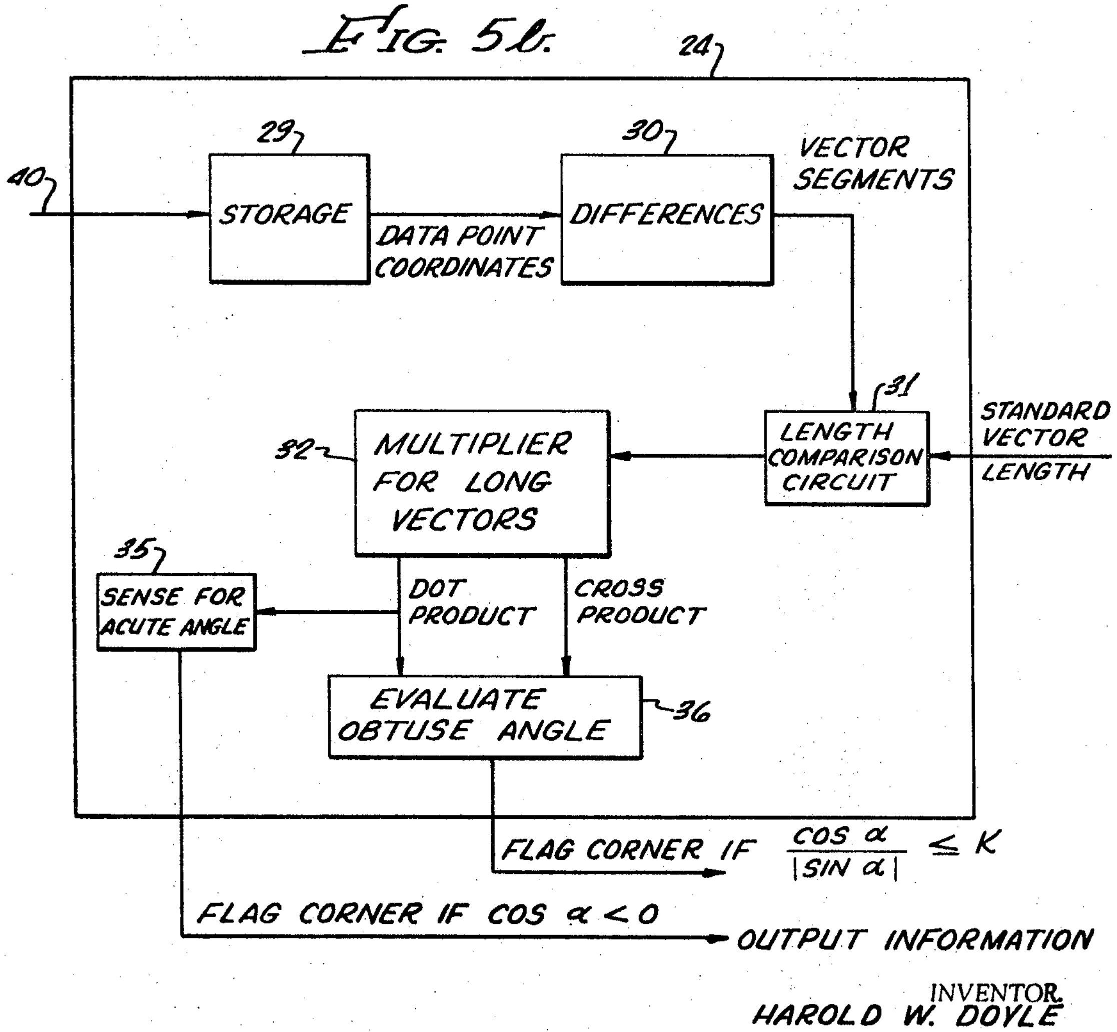

A block diagram of the operative elements of the corner recognition system is shown in FIG. 5*a*. FIG. 5*b* shows a block diagram of the basic parts of the processor 24. Data representing the contour 23 is gathered by the digitizer 21 which operates to store in cartesian axis representation in either incremental or whole values the coordinates of each successive sample point. The coordinate information is transmitted to the data storage 29 where it is assembled and operated on by the differencer 30 to generate the vector segments connecting each of the successive points which define the contour 23. Each segment is then identified by the comparison circuit 31 as being either short 0 or long 1 according to the dictates of the particular application. Vector segments labeled long are then taken sequentially in conjunction with the next occurring long segment to determine whether a case for corner recognition exists as per FIG. 4. If so, the dot product (and where necessary the cross product) is formed by the multiplier 32 and the results tested by the acute interior angle sensor 35 and obtuse interior angle evaluator 36. Where corner reconstruction is required, as in Cases II*b* and III*b*, the coordinates of the vertex are computed and identified as a corner. The recognized corners together with the original data is typically outputted on punched cards or magnetic tape for permanent storage.

Where it is mandatory to recognize corners and the graphical data has been automatically digitized with no special means being provided in the digitizing process for sensing corners, a system for distinguishing corners from the totality of data points is a necessity. However, the method of the invention is not restricted to a system which automatically generates empirical data points, but is equally applicable to systems which incorporate manual digitizing as well.

Although the concepts of the invention have been illustrated in conjunction with the recognition of corners as a control for pattern grading, the basic teachings are equally useful in any application where similar manipulation of graphical data is required. It will be understood that the detailed description of a preferred embodiment is by way of illustration only, and that numerous modifications of the basic apparatus are possible without departing from the spirit of the invention.

We claim:

1. A processing unit for determining the corners of an empirical shape from a cartesian digitized representation of said empirical shape comprising:
   - storage means for holding the coordinates of edge defining data points;
   - means for operatively subtracting the coordinates of adjacent data points stored by said storage means to form the cartesian equation of the vectors connecting adjacent data points;
   - a comparison circuit for testing the magnitude of each vector so formed whereby each of said vectors is classified as short or long according to a prescribed standard;
   - means for testing the angle formed by successive long vectors as a corner.

2. The apparatus described in claim 1 wherein said means for testing the angle between successive long vectors comprises:
   - a multiplier for forming the dot (scalar) product and cross (vector) product between successive long vectors;
   - means for sensing the sign of the dot product to determine whether the angle formed between successive long vectors is acute or obtuse whereby acute interior angles may be recognized as a corner;
   - means for forming the ratio between the dot and cross product of successive long vectors forming an obtuse interior angle whereby angles having a cotangent less than a predetermined value may be recognized as a corner;
   - means for locating the intersection of extensions of successive long vectors which are not adjacent whereby the coordinates of an approximate vertex may be determined.

3. An apparatus for recognizing the corners of graphically displayed information comprising:
   - digitizing means for converting said graphically displayed information into digital data points;
   - computer means connected to said digitizing means and to the data supplied by said digitizing means for determining the vector equation connecting each pair of adjacent data points;
   - comparator means responsively connected to said computer means for identifying all vectors longer than a predetermined length;
   - arithmetic means responsively connected to said computer means and said comparator means for testing the angles between successive long vectors whereby all interior angles less than a predetermined value may be recognized as a corner.

4. The apparatus claimed in claim 3 wherein said arithmetic means comprises:
   - a multiplier for forming the dot (scalar) product between successive long vectors;
   - a polarity tester responsively connected to said multiplier for sensing the sign of the dot product to determine whether the interior angle defined by successive long vectors is acute or obtuse;
   - a multiplier for calculating the cross (vector) product between successive long vectors whereby the magnitude of interior obtuse angles defined thereby may be determined from the ratio of dot and cross product; and
   - comparison means responsively connected to said multiplier and said polarity tester for identifying all interior angles less than a predetermined value as corners.

5. A method of recognizing the corners of an empirical shape comprising the steps of:
   - digitizing the data representing the empirical shape;
   - forming the vector representation of the line segments connecting consecutive data points;
   - forming the dot product of the vectors representing consecutive segments of the empirical shape;
   - comparing the dot product with a preestablished standard to determine whether it is less than a certain value whereby the coordinate location of a corner may be identified.

6. A method of recognizing the corners of graphically displayed data comprising the steps of:
   - forming the vector representation of the line segments connecting consecutive data points;
   - calculating the lengths of each vector so formed;
   - identifying all vector lengths in excess of a preestablished value;
   - multiplying successive long vectors together to form the dot product;
   - comparing the dot products so formed with a preestablished standard to determine whether a corner exists.